(12) United States Patent
Kanazawa et al.

(10) Patent No.: US 11,288,556 B2
(45) Date of Patent: Mar. 29, 2022

(54) IMAGE FORMING APPARATUS THAT RENDERS A CHARACTER USING ONE OUTLINE DATA OUT OF MULTIPLE DIFFERENT OUTLINE DATA, IMAGE FORMING METHOD INCLUDING RENDERING A CHARACTER USING ONE OUTLINE DATA OUT OF MULTIPLE DIFFERENT OUTLINE DATA, AND NON-TRANSITORY COMPUTER READABLE RECORDING MEDIUM THAT RECORDS AN INFORMATION PROCESSING PROGRAM THAT REALIZES THE IMAGE FORMING METHOD INCLUDING RENDERING A CHARACTER USING ONE OUTLINE DATA OUT OF MULTIPLE DIFFERENT OUTLINE DATA

(71) Applicant: KYOCERA DOCUMENT SOLUTIONS INC., Osaka (JP)

(72) Inventors: Keizen Kanazawa, Concord, CA (US); Mike Maready, Sr., Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/984,371

(22) Filed: Aug. 4, 2020

(65) Prior Publication Data

US 2022/0044083 A1 Feb. 10, 2022

(51) Int. Cl.
*G06K 15/02* (2006.01)

(52) U.S. Cl.
CPC ..... *G06K 15/1802* (2013.01); *G06K 15/1834* (2013.01)

(58) Field of Classification Search
CPC .................................................. G06K 15/1802
(Continued)

(56) References Cited

U.S. PATENT DOCUMENTS

| 6,057,825 A * | 5/2000 | Takakura ................ G06T 11/40 345/24 |
| 2003/0128382 A1* | 7/2003 | Brown .................. G06F 40/109 358/1.14 |

(Continued)

FOREIGN PATENT DOCUMENTS

| JP | 05073027 A | 3/1993 |
| JP | 05265429 A | 10/1993 |

*Primary Examiner* — Jacky X Zheng
(74) *Attorney, Agent, or Firm* — Li & Cai Intellectual Property (USA) Office

(57) ABSTRACT

An apparatus includes: a communication interface configured to receive printable data including a character code; and a controller circuitry configured to operate as a font module including font data and a font data supplying unit, the font data including a character code and multiple different outline data in association with the character code, each of the multiple different outline data being used to render a character specified by the character code, the font data supplying unit being configured to supply one outline data to the text processing unit, a text processing unit configured to obtain the one outline data from the font data supplying unit out of the multiple different outline data in association with the character code included in the printable data, and a character rendering unit configured to render the character specified by the character code included in the printable data by using the one outline data.

9 Claims, 3 Drawing Sheets

(58) Field of Classification Search
 USPC ........................................................ 358/1.11
 See application file for complete search history.

(56) References Cited

U.S. PATENT DOCUMENTS

2006/0192781 A1* 8/2006 Iwata ..................... G09G 5/246
 345/467
2018/0121771 A1* 5/2018 Yudasaka ........... G06K 15/1827

* cited by examiner

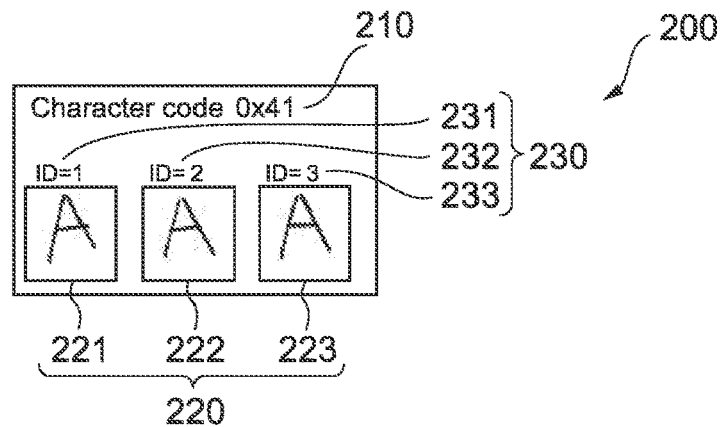
FIG.3
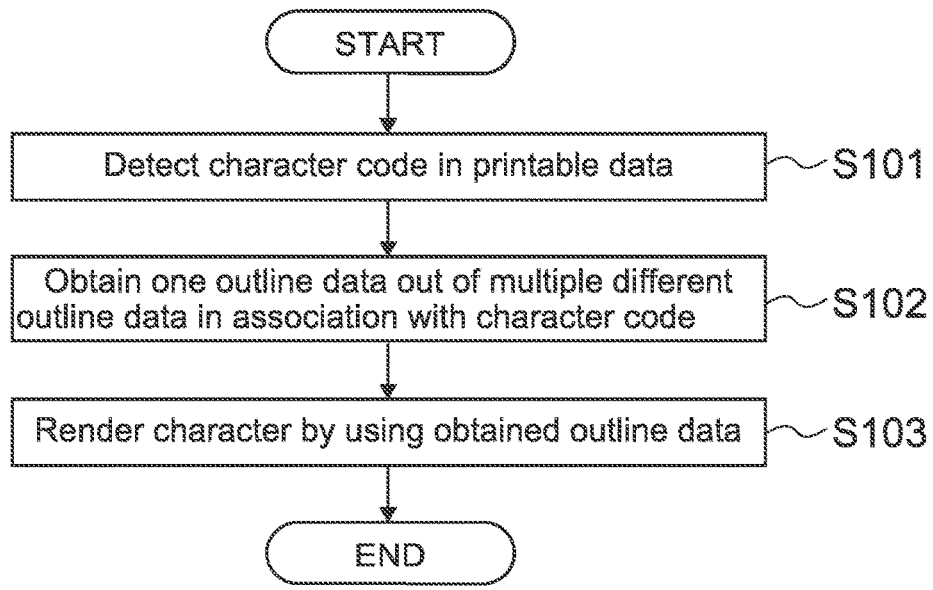
FIG.4
FIG.5

IMAGE FORMING APPARATUS THAT RENDERS A CHARACTER USING ONE OUTLINE DATA OUT OF MULTIPLE DIFFERENT OUTLINE DATA, IMAGE FORMING METHOD INCLUDING RENDERING A CHARACTER USING ONE OUTLINE DATA OUT OF MULTIPLE DIFFERENT OUTLINE DATA, AND NON-TRANSITORY COMPUTER READABLE RECORDING MEDIUM THAT RECORDS AN INFORMATION PROCESSING PROGRAM THAT REALIZES THE IMAGE FORMING METHOD INCLUDING RENDERING A CHARACTER USING ONE OUTLINE DATA OUT OF MULTIPLE DIFFERENT OUTLINE DATA

FIELD OF THE DISCLOSURE

The present disclosure relates to an image forming apparatus that renders characters specified by character codes included in printable data. The present disclosure further relates to an image forming method. The present disclosure further relates to a non-transitory computer readable recording medium that records an information processing program.

FIELD OF THE DISCLOSURE

There is known an image forming apparatus that renders characters specified by character codes included in printable data received from a host apparatus by using a font specified in the printable data.

SUMMARY OF THE DISCLOSURE

According to an embodiment of the present disclosure, there is provided an image forming apparatus, including:
  a communication interface configured to receive printable data including a character code from a host apparatus; and
  a controller circuitry configured to operate as
    a font module including font data and a font data supplying unit, the font data including a character code and multiple different outline data in association with the character code, each of the multiple different outline data being used to render a character specified by the character code, the font data supplying unit being configured to supply one outline data to the text processing unit,
    a text processing unit configured to obtain the one outline data from the font data supplying unit out of the multiple different outline data in association with the character code included in the printable data, and
    a character rendering unit configured to render the character specified by the character code included in the printable data by using the one outline data.

According to an embodiment of the present disclosure, there is provided an image forming method, including:
  receiving printable data including a character code from a host apparatus;
  obtaining one outline data from a font data supplying unit of a font module, the font module including font data and the font data supplying unit, the font data including a character code and multiple different outline data in association with the character code, each of the multiple different outline data being used to render a character specified by the character code, the font data supplying unit being configured to supply one outline data to the text processing unit, out of the multiple different outline data in association with the character code included in the printable data; and
  rendering the character specified by the character code included in the printable data by using the one outline data.

According to an embodiment of the present disclosure, there is provided a non-transitory computer readable recording medium that records an information processing program executable by a controller circuitry of an image forming apparatus including a communication interface configured to receive printable data including a character code from a host apparatus and the controller circuitry, the information processing program causing the controller circuitry to operate as
  a font module including font data and a font data supplying unit, the font data including a character code and multiple different outline data in association with the character code, each of the multiple different outline data being used to render a character specified by the character code, the font data supplying unit being configured to supply one outline data to the text processing unit,
  a text processing unit configured to obtain the one outline data from the font data supplying unit out of the multiple different outline data in association with the character code included in the printable data, and
  a character rendering unit configured to render the character specified by the character code included in the printable data by using the one outline data.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 schematically shows a structure of font data;

FIG. 4 schematically shows a structure of an outline data ID list; and

FIG. 5 shows an operational flow of the image forming apparatus.

DETAILED DESCRIPTION OF THE EXEMPLARY EMBODIMENTS

Hereinafter, an embodiment of the present disclosure will be described with reference to the drawings.

1. HARDWARE CONFIGURATION OF IMAGE FORMING APPARATUS

Figure 1:
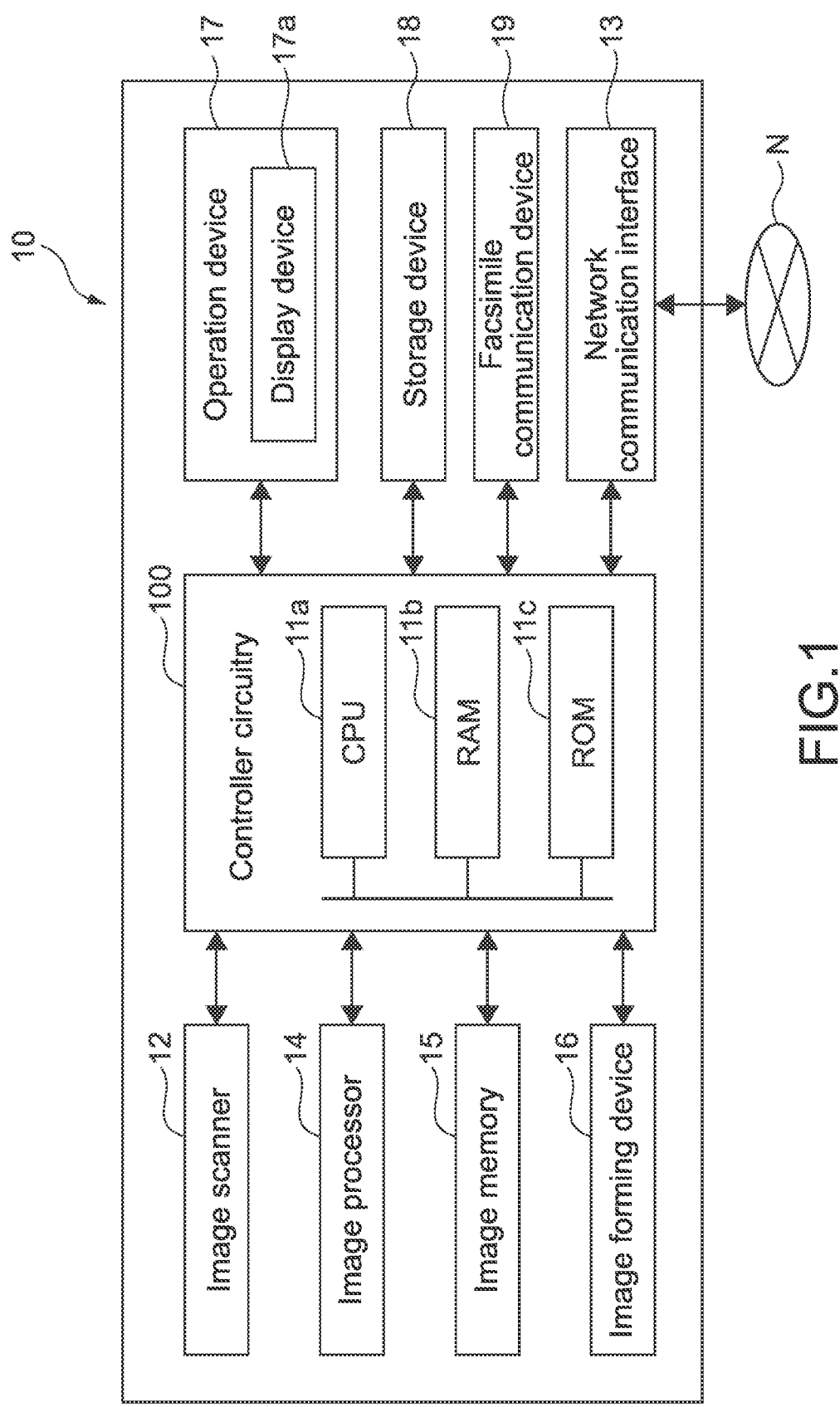
FIG. 1 shows a hardware configuration of an image forming apparatus according to an embodiment of the present disclosure.

FIG. 1 shows a hardware configuration of an image forming apparatus.

The image forming apparatus 10 includes the controller circuitry 100. The controller circuitry 100 includes the CPU (Central Processing Unit) 11*a*, the RAM (Random Access Memory) 11*b*, the ROM (Read Only Memory) 11*c*, dedicated hardware circuits, and the like and performs overall operational control of the image forming apparatus 10. The CPU 11*a* loads information processing programs (including image processing program) stored in the ROM 11*c* in the RAM 11*b* and executes the information processing programs. The ROM 11*c* is a nonvolatile memory that stores programs executable by the CPU 11a, data, and the like. The ROM 11c is an example of a non-transitory computer readable recording medium.

The controller circuitry 100 is connected to the image scanner 12, the image processor 14 (including GPU (Graphics Processing Unit)), the image memory 15, the image forming device 16 (printer device), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 including the display device 17a (touch panel) is one mode of an input device. A sound input device including a microphone may be provided as an input device.

2. FUNCTIONAL CONFIGURATION OF IMAGE FORMING APPARATUS

Figure 2:
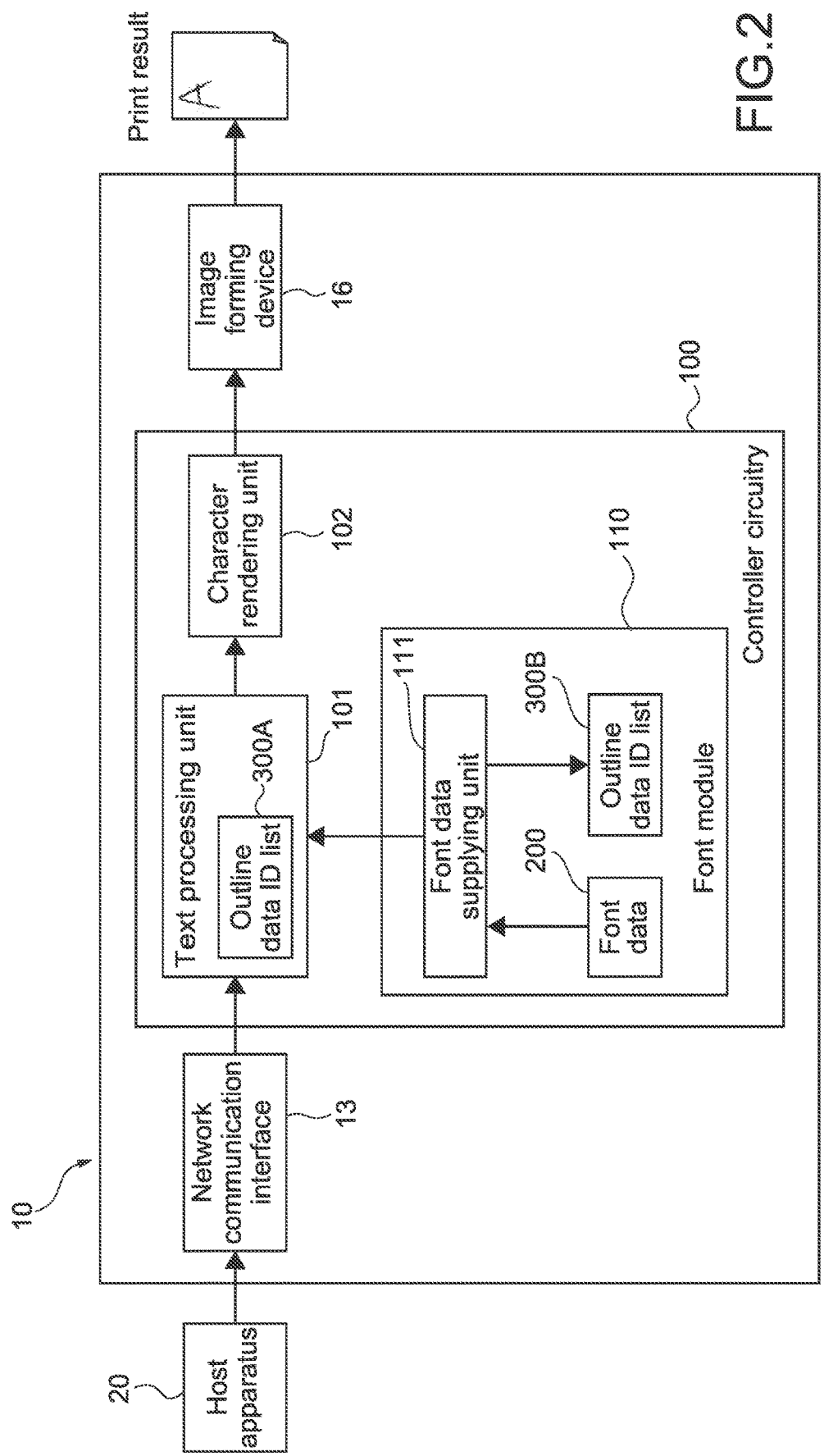
FIG. 2 is a functional configuration of the image forming apparatus.

FIG. 2 is a functional configuration of the image forming apparatus.

In the controller circuitry 100 of the image forming apparatus 10, the CPU 11a loads an information processing program stored in the ROM 11c in the RAM 11b and executes the information processing program to operate as the text processing unit 101 and the character rendering unit 102. The image forming apparatus 10 executes the font module 110. The font module 110 includes the font data 200 and the font data supplying unit 111. The font data supplying unit 111 reads outline data corresponding to a character code specified by the text processing unit 101 from the font data 200, and supplies the outline data to the text processing unit 101. One of the text processing unit 101 or the font data supplying unit 111 includes the outline data ID list 300A or the outline data ID list 300B. FIG. 2 shows two outline data ID lists 300A and 300B as an example. However, actually, the image forming apparatus 10 includes one outline data ID list 300A or 300B. Hereinafter, the outline data ID list 300A or 300B will be simply referred to as "the outline data ID list 300".

3. STRUCTURE OF FONT DATA

FIG. 3 schematically shows a structure of font data.

The font data 200 is a data set used to render one certain kind of font set (typically, handwritten font set). The font data 200 for one character includes the character code 210, and the multiple different outline data 220 in association with the character code 210. Each multiple different outline data 220 is identified by each outline data ID 230. For example, the multiple different outline data 221, 222, and 223 is in association with the character code 210 "0x41" (which means "capital letter A"). Each of the multiple different outline data 221, 222, and 223 is identified by each of the outline data IDs 231, 232, and 233. The outline data ID 230 is, typically, a serial number "1", "2", or "3". The outline data 220 is used to render a character specified by the character code 210 (for example, "capital letter A" specified by the character code 210 "0x41").

4. STRUCTURE OF OUTLINE DATA ID LIST

FIG. 4 schematically shows a structure of an outline data ID list.

The outline data ID list 300 stores the character code 310, the multiple different outline data IDs 330, and the flag 340 in association with each other. The character code 310 and the multiple different outline data IDs 330 are the same as the character code 210 and the outline data IDs 230 in association with the character code 210. The character code 210 and the outline data IDs 230 are included in the font data 200. The outline data IDs 230 identify the multiple different outline data 220, respectively. The flag 340 is set, for example, in association with the outline data ID 330, which was used to render a character last time.

5. OPERATIONAL FLOW OF IMAGE FORMING APPARATUS

FIG. 5 shows an operational flow of the image forming apparatus.

The image forming apparatus 10 receives printable data from the host apparatus 20 connected to the network N via the network communication interface 13. The printable data is described in, for example, a PDL (Page Description Language). The printable data includes character codes. The printable data may further include a rendering attribute (character color, background color (highlight), font size, italic, bold, etc.).

The text processing unit 101 detects a character code included in the printable data (Step S101). The text processing unit 101 obtains, from the font data supplying unit 111, one outline data 220 out of the multiple different outline data 220 in association with the character code 210 of the font data 200 (Step S102). The character rendering unit 102 renders the character specified by the character code 210 included in the printable data by using the one outline data 220 that the text processing unit 101 obtains from the font data supplying unit 111 (Step S103). Where the printable data includes a rendering attribute (character color, background color (highlight), font size, italic, bold, etc.), the character rendering unit 102 renders the character based on the rendering attribute, and creates bitmap data. The image forming device 16 outputs the bitmap data and obtains a print result (FIG. 2).

As described above, the font data 200 includes the character code 210 and the multiple different outline data 220 in association with the character code 210. The character rendering unit 102 renders the character specified by the character code 210 by using one outline data 220. Therefore, by using different outline data 220 every time, the character specified by the same character code 210 is rendered in a different touch. In one use case, in a handwritten font format, the same characters, which appear several times, are rendered in different forms. As a result, handwritten characters more and more look like a real handwritten touch.

Specific examples (1) to (4) of the method of obtaining one outline data 220 by the text processing unit 101 (Step S102) will be described.

(1) With reference to the outline data ID list 300A, the text processing unit 101 randomly determines one outline data ID 330 in association with the character code 310 included in the printable data. The text processing unit 101 notifies the font data supplying unit 111 of the character code 310 and the one determined outline data ID 330. In other words, the text processing unit 101 requests outline data, which is identified by the outline data ID 330 and is of the character specified by the character code 310, from the font data supplying unit 111. The font data supplying unit 111 reads the outline data 220, which is identified by the outline data ID 230 and is of the character specified by the character code 210 included in the request obtained from the text processing unit 101, from the font data 200. The font data supplying unit 111 supplies the one read outline data 220 to the text processing unit 101. The text processing unit 101 obtains the one outline data 220 from the font data supplying unit 111.

(2) With reference to the outline data ID list 300A, the text processing unit 101 determines one outline data ID 330 in association with the character code 310 included in the printable data in turn. To determine "in turn" means to determine not randomly but in the order of the outline data ID 330 (in the order of the serial number). Specifically, the text processing unit 101 increments (+1) the outline data ID 330 with the flag 340 (which means the outline data 220 used last time) out of the multiple outline data IDs 330 in association with the character code 310 included in the printable data. The text processing unit 101 determines the incremented outline data ID 330 as the outline data ID 330 to be used this time. The text processing unit 101 sets the flag 340 on the incremented outline data ID 330. The text processing unit 101 notifies the font data supplying unit 111 of the character code 310 and the one determined outline data ID 330. In other words, the text processing unit 101 requests outline data, which is identified by the outline data ID 330 and is of the character specified by the character code 310, from the font data supplying unit 111. The font data supplying unit 111 reads the outline data 220, which is identified by the outline data ID 230 and is of the character specified by the character code 210 included in the request obtained from the text processing unit 101, from the font data 200. The font data supplying unit 111 supplies the one read outline data 220 to the text processing unit 101. The text processing unit 101 obtains the one outline data 220 from the font data supplying unit 111.

(3) The text processing unit 101 notifies the font data supplying unit 111 of the character code included in the printable data. In other words, the text processing unit 101 requests one (arbitrary) outline data of the character specified by the character code from the font data supplying unit 111. With reference to the outline data ID list 300B, the font data supplying unit 111 randomly determines one outline data ID 330 in association with the character code 310 included in the request obtained from the text processing unit 101. The font data supplying unit 111 reads the outline data 220, which is identified by the outline data ID 230 determined by the font data supplying unit 111 and is of the character specified by the character code 210 included in the request obtained from the text processing unit 101, from the font data 200. The font data supplying unit 111 supplies the one read outline data 220 to the text processing unit 101. The text processing unit 101 obtains the one outline data 220 from the font data supplying unit 111.

(4) The text processing unit 101 notifies the font data supplying unit 111 of the character code included in the printable data. In other words, the text processing unit 101 requests one (arbitrary) outline data of the character specified by the character code from the font data supplying unit 111. With reference to the outline data ID list 300B, the font data supplying unit 111 determines one outline data ID 330 in association with the character code 310 included in the request obtained from the text processing unit 101 in turn. Specifically, the font data supplying unit 111 increments (+1) the outline data ID 330 with the flag 340 (which means the outline data 220 used last time) out of the multiple outline data IDs 330 in association with the character code 310 included in the request obtained from the text processing unit 101. The font data supplying unit 111 determines the incremented outline data ID 330 as the outline data ID 330 to be used this time. The font data supplying unit 111 sets the flag 340 on the incremented outline data ID 330. The font data supplying unit 111 reads the outline data 220, which is identified by the outline data ID 230 determined by the font data supplying unit 111 and is of the character specified by the character code 210 included in the request obtained from the text processing unit 101, from the font data 200. The font data supplying unit 111 supplies the one read outline data 220 to the text processing unit 101. The text processing unit 101 obtains the one outline data 220 from the font data supplying unit 111.

The method of determining the outline data ID 330 in turn (aforementioned (2) and (4)) will be described more specifically. Where the outline data ID list 300 includes no outline data ID 330 with the flag 340, the text processing unit 101 or the font data supplying unit 111 may determine an arbitrary outline data ID 330 (for example, the smallest serial number). Where the last outline data ID 330 (for example, the largest serial number) has the flag 340, the text processing unit 101 or the font data supplying unit 111 may determine the first outline data ID 330 (for example, the smallest serial number). The text processing unit 101 or the font data supplying unit 111 may reset the flag 340 at the job end timing. In this case, irrespective of the outline data obtained lastly in the last job, the text processing unit 101 obtains the outline data 220 of the first outline data ID 230 (first turn) in the next job. Alternatively, the text processing unit 101 or the font data supplying unit 111 may not reset the flag 340 at the job end timing. In this case, the text processing unit 101 obtains the outline data 220 of the outline data ID 230, which is the next turn of the outline data ID 230 if the outline data lastly obtained (used) in the last job.

6. CONCLUSION

There is known a handwritten font set used to render pseudo-handwritten texts used in, for example, a word processor software. Typically, one kind of font set has one outline data for one character code. The same characters are always rendered by using the one same outline data. So the same characters always have the shame shape as a rule. However, when a person actually handwrites the same characters, the shapes are different from each other. So, even if a handwritten font set is used, it is difficult to render natural pseudo-handwritten characters that look like human handwritten characters.

(1) In view of the aforementioned circumstances, according to the present embodiment, the font module 110 includes the font data 200 and the font data supplying unit 111. The font data 200 includes the character code 210, and the multiple different outline data 220 in association with the character code 210, the multiple different outline data 220 being used to render a character specified by the character code 210. The font data supplying unit 111 supplies the outline data 220 to the text processing unit 101. The text processing unit 101 obtains one outline data 220 out of the multiple different outline data 220 in association with the character code 210 included in the printable data. The character rendering unit 102 renders the character specified by the character code included in the printable data by using the one outline data 220. Therefore, by using different outline data 220 every time, the character specified by the same character code 210 is rendered in a different touch. In one use case, in a handwritten font format, the same characters, which appear several times, are rendered in different forms. As a result, handwritten characters more and more look like a real handwritten touch. In other words, by using the different outline data 220 every time, the rendering result of the same character differs every time. As a result, the rendering result may look like natural and real handwritten characters.

(2) According to the present embodiment, the text processing unit 101 may obtain one outline data 220 randomly out of the multiple different outline data 220 in association with the character code 210. As a result, the same characters, which appear several times, are rendered in different forms randomly. As a result, handwritten characters more and more look like a real handwritten touch.

(3) According to the present embodiment, the text processing unit 101 may obtain one outline data 220 in turn out of the multiple different outline data 220 in association with the character code 210. As a result, in rendering the same characters that appear several times, the same character shapes do not appear again and again. As a result, handwritten characters more and more look like a real handwritten touch.

(4) According to the present embodiment, the text processing unit 101 may obtain, in a next job, the outline data 220 of a next turn, which is next to the outline data 220 lastly obtained in a last job. As a result, for example, where multiple print sets are output, the character at one position may be output in different character shapes in different print sets. As a result, handwritten characters more and more look like a real handwritten touch.

(5) According to the present embodiment, the text processing unit 101 may obtain, in a next job, the outline data 220 of a first turn, irrespective of the outline data 220 lastly obtained in a last job. As a result, for example, where multiple print sets are output, the character at one position is output in the same character shape in different print sets. As a result, handwritten characters more and more look like a real handwritten touch with the uniformity of the print result set.

(6) According to the present embodiment, the text processing unit 101 may determine one outline data 220 to be obtained out of the multiple different outline data 220, and request the one outline data 220 from the font data supplying unit 111. In this case, the font data supplying unit 111 supplies the one outline data 220 specified by the text processing unit 101 to the text processing unit 101. In this case, the text processing unit 101 determines the outline data 220. Where the image forming apparatus 10 has the multiple kinds of font data 200 (each font data 200 has multiple outline data 220 for one character code 210), the text processing unit 101 may render characters specified by the same character code 210 of each font data 200 in a different touch.

(7) According to the present embodiment, the text processing unit 101 may request one outline data 220 out of the multiple different outline data 220 from the font data supplying unit 111. In this case, the font data supplying unit 111 determines one outline data 220 to be supplied, and supplies the determined outline data 220 to the text processing unit 101. Also according to this method, by using different outline data 220 every time, the character specified by the same character code 210 is rendered in a different touch.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a communication interface configured to receive printable data including a character code from a host apparatus; and
a controller circuitry configured to operate as
a font module including font data and a font data supplying unit, the font data including a character code and multiple different outline data in association with the character code, each of the multiple different outline data being used to render a character specified by the character code, the font data supplying unit being configured to supply one outline data to a text processing unit,
a text processing unit configured to obtain the one outline data from the font data supplying unit randomly out of the multiple different outline data in association with the character code included in the printable data, and
a character rendering unit configured to render the character specified by the character code included in the printable data by using the one outline data.

2. The image forming apparatus according to claim 1, wherein
the text processing unit is configured to determine one outline data to be obtained out of the multiple different outline data, and request the one outline data from the font data supplying unit, and
the font data supplying unit is configured to supply the one outline data specified by the text processing unit to the text processing unit.

3. The image forming apparatus according to claim 1, wherein
the text processing unit is configured to request one outline data out of the multiple different outline data from the font data supplying unit, and
the font data supplying unit is configured to determine one outline data to be supplied, and supply the determined outline data to the text processing unit.

4. An image forming method, comprising:
receiving printable data including a character code from a host apparatus;
obtaining one outline data from a font data supplying unit of a font module, the font module including font data and the font data supplying unit, the font data including a character code and multiple different outline data in association with the character code, each of the multiple different outline data being used to render a character specified by the character code, the font data supplying unit being configured to supply one outline data to a text processing unit, randomly out of the multiple different outline data in association with the character code included in the printable data; and
rendering the character specified by the character code included in the printable data by using the one outline data.

5. The image forming method according to claim 4, further comprising:
determining one outline data to be obtained out of the multiple different outline data, and requesting the one outline data from the font data supplying unit; and
supplying the one outline data specified by the text processing unit to the text processing unit.

6. The image forming method according to claim 4, further comprising:
requesting one outline data out of the multiple different outline data from the font data supplying unit; and determining one outline data to be supplied, and supplying the determined outline data to the text processing unit.

7. A non-transitory computer readable recording medium that records an information processing program executable by a controller circuitry of an image forming apparatus including a communication interface configured to receive printable data including a character code from a host apparatus and the controller circuitry, the information processing program causing the controller circuitry to operate as a font module including font data and a font data supplying unit, the font data including a character code and multiple different outline data in association with the character code, each of the multiple different outline data being used to render a character specified by the character code, the font data supplying unit being configured to supply one outline data to a text processing unit, a text processing unit configured to obtain the one outline data from the font data supplying unit randomly out of the multiple different outline data in association with the character code included in the printable data, and a character rendering unit configured to render the character specified by the character code included in the printable data by using the one outline data.

8. The non-transitory computer readable recording medium according to claim 7, wherein the text processing unit is configured to determine one outline data to be obtained out of the multiple different outline data, and request the one outline data from the font data supplying unit, and the font data supplying unit is configured to supply the one outline data specified by the text processing unit to the text processing unit.

9. The non-transitory computer readable recording medium according to claim 7, wherein the text processing unit is configured to request one outline data out of the multiple different outline data from the font data supplying unit, and the font data supplying unit is configured to determine one outline data to be supplied, and supply the determined outline data to the text processing unit.

* * * * *